United States Patent Office 2,979,027
Patented Apr. 11, 1961

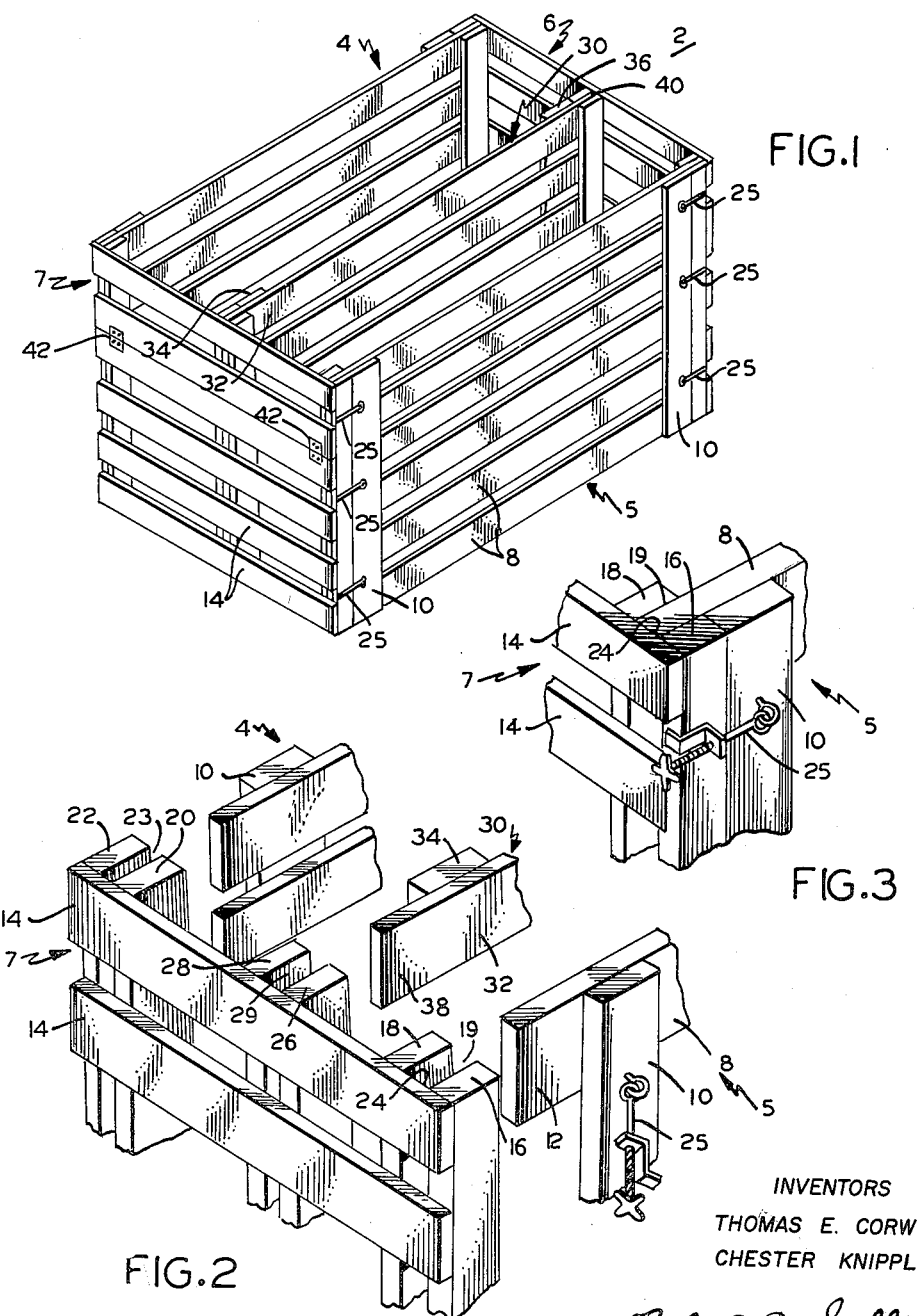

2,979,027
PORTABLE ANIMAL STALL

Thomas E. Corwin, Woodhaven, and Chester Knipple, Glenwood Landing, N.Y., assignors to Joseph E. Harder, Westbury, N.Y.

Filed Jan. 20, 1959, Ser. No. 787,947

2 Claims. (Cl. 119—15)

This invention relates to a device for transporting animals and in particular to an improved detachable stall for shipping animals in airplanes, ships and the like.

In this day of modern air transportation, the vista of international competition has been increased tremendously by the ability to transport competitive animals, such as race horses, by air.

Since the plane usually is not used exclusively for animal transportation, however, any stalls used in the plane must be readily assembled aboard the plane when it is to carry animals, and then disassembled when the plane carries other cargo.

Unfortunately, it happens frequently in air transportation that a horse becomes startled by the roar of the engines or undulations of the airplane to the extent that it goes out of its mind. The horse has been known to tear down conventional, detachable stalls and injure itself so severely that it had to be destroyed.

It follows, therefore, that there is a need for stalls which can be assembled within an airplane, and which will provide sturdy support for the animal.

Accordingly, it is the first object of this invention to provide an improved stall which can be readily assembled or disassembled to meet the needs of present transportation facilities.

It is a further object of this invention to provide an improved detachable stall assembly wherein an increased amount of rigidity is given to the stall.

It is still a further object of this invention to provide an improved detachable stall which can be assembled into a sturdy unit.

Further objects and advantages of this invention will become apparent and the invention will be more clearly understood from the following description and accompanying drawings in which:

Figure 1 is a perspective view of the stall.

Fig. 2 is an exploded view showing separable stall portions ready to be interlocked; and Fig. 3 shows portions of the stall in interlocked position.

In the drawing:

The stall 2 is shown comprising longitudinal members 4, 5 and transverse members 6, 7. The longitudinal members are made up of a plurality of spaced apart slats 8 which are tied together by stringers 10 so located with regard to the ends of slats 8, as to define ends or tongues 12.

The transverse members 6, 7 have a plurality of slats 14 preferably equal in number to those of the longitudinal members 4. The slats 14 of the end member 7 are tied together at each end by a pair of stringers 16, 18 and 20, 22 respectively. Each pair of stringers is spaced apart to form channels or grooves 19, 23, respectively which interlock with the tongues 12 of the longitudinal slats 8 in a nesting relationship. It follows that the tongues 12 should extend beyond their respective stringers 10 a distance which will permit them to fit in between the stringers 16, 18 and butt up against the inner side 24 of the slats 14.

When assembled, the interlocked members are held in place by detachable bolts 25 which are located in all four corners of the stall.

This construction is identical for each corner, and it is apparent that the interlocking tongue and nest construction provides a sturdy, yet detachable stall assembly. The fact that the nests 19, 23 closely embrace the tongues 12 reduces to a minimum the possibility of end sway in the plane of the end members 6, 7. This is particularly important since animals need the comfort of and security of knowing that the stall will support them—as a matter of fact, they rest while leaning against the stall.

On occasion, it is desirable to arrange the stall for the transportation of two or more animals. To accomplish this, the slats 14 of each end as shown for end 7 are equipped with a center pair of stringers 26, 28 which define a nest 29 for engaging a removable center partition 30 which in turn comprises a plurality of longitudinal slats 32 held by stringers 34, 36 which define end portions or tongues 38, 40 on the longitudinal slats 32. The tongues 38 slide down in the nest 29 to form an interlocking engagement that further stabilizes the transverse members against sway, while providing two stall compartments.

As an incidental feature of this invention, the transverse members 6,7 are equipped with hinges 42 to permit certain of the slats 14 to be dropped so that the animals head may extend beyond the stall.

It is thought that the invention and many of its attendant advantages will be understood from the foregoing description, and it will be apparent that various changes may be made in the form, or instructions of the parts without departing from the spirit and scope of the invention which is claimed herein.

We claim:

1. A separable component stall comprising detachable longitudinal members, transverse members, and locking means for holding said members in interlocking engagement, said longitudinal members comprising a plurality of slats including separate stringer members positioned adjacent but spaced from each end of each longitudinal member and rigidly secured to the respective longitudinal members to hold said slats in spaced apart relation while defining extending tongue portions on each end of said longitudinal members, said transverse members having a plurality of spaced apart slats including a pair of stringer members rigidly secured to each end of said transverse slats to hold the same in spaced apart relation while defining channels or grooves between each pair positioned to be engageable with said longitudinal tongue portions to embrace the same thereby eliminating sway in said transverse members; and removable fastening means for releasably holding said longitudinal and transverse members in assembled relation.

2. A separable component stall comprising longitudinal members having a plurality of spaced apart slats, transverse end members having spaced apart slats conforming with those of said longitudinal members, and means interconnecting said transverse end members and longitudinal members to eliminate sway in the plane of said transverse end members, said interconnecting means comprising separate stringer members rigidly connected to said longitudinal slats adjacent but spaced from each end of said slats to define extending tongue portions on said longitudinal members, a pair of parallel stringer members rigidly connected at each end of the slats of said transverse members to define channels or grooves between each pair which embraces the tongue portions of said longitudinal members, and releasable fastening means for holding said longitudinal and transverse members in detachable assembled relationship.

References Cited in the file of this patent

UNITED STATES PATENTS

| | | |
|---|---|---|
| 349,200 | Balmer | Sept. 14, 1886 |
| 423,330 | Lane | Mar. 11, 1890 |
| 473,092 | Snowden et al. | Apr. 19, 1892 |
| 499,757 | Seeberger | June 20, 1893 |
| 534,389 | Duncan | Feb. 19, 1895 |
| 933,242 | Erb | Sept. 7, 1909 |
| 2,373,858 | Solyst | Apr. 17, 1945 |